E. SCOTT.
SUPPLEMENTARY COVER OR BAND FOR PNEUMATIC TIRES.
APPLICATION FILED AUG. 1, 1913.

1,109,874.

Patented Sept. 8, 1914.

Witnesses
J. W. Wynkoop.
A. B. Chinn

Inventor
Edward Scott,
By Knight Bros.
Attorneys.

UNITED STATES PATENT OFFICE.

EDWARD SCOTT, OF WOOLER, ENGLAND.

SUPPLEMENTARY COVER OR BAND FOR PNEUMATIC TIRES.

1,109,874.  Specification of Letters Patent.  Patented Sept. 8, 1914.

Application filed August 1, 1913. Serial No. 782,488.

*To all whom it may concern:*

Be it known that I, EDWARD SCOTT, a subject of the King of the United Kingdom of Great Britain and Ireland, and resident of the Cycle Works and Motor Garage, Market Place, Wooler, Northumberland, England, engineer, have invented certain new and useful Improvements in and Relating to Supplementary Covers or Bands for Pnuematic Tires, of which the following is a specification.

Under this invention the cover or band is secured upon the tire in such manner that dust and moisture is prevented from lodging between the cover or band and the tire while the edges or sides of the cover or band are prevented from chafing and wearing the sides of the tire.

In order that the invention may be clearly understood I have hereunto appended explanatory drawings whereon—

Figure 1:
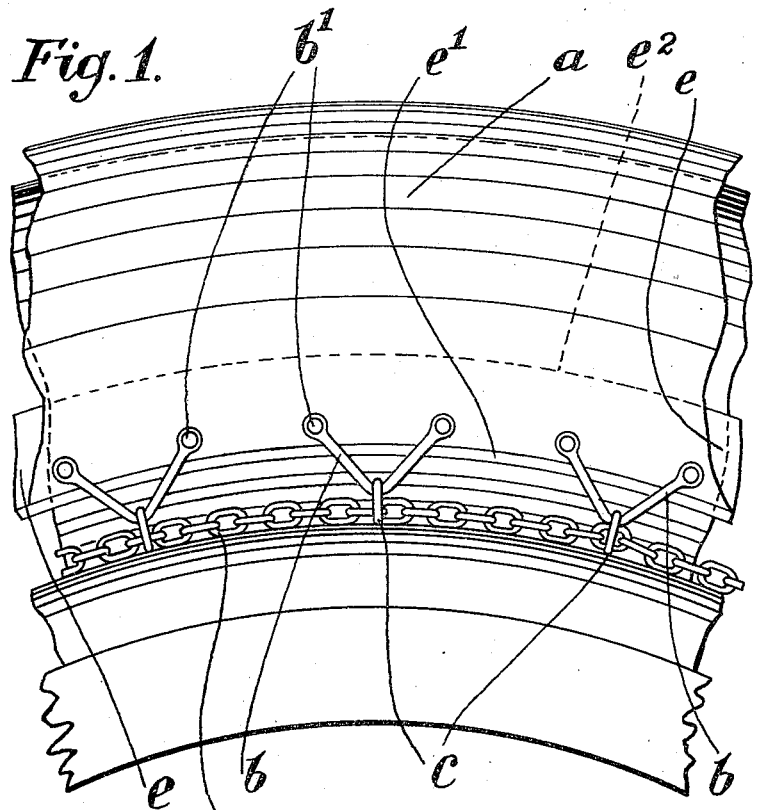
Figure 2:
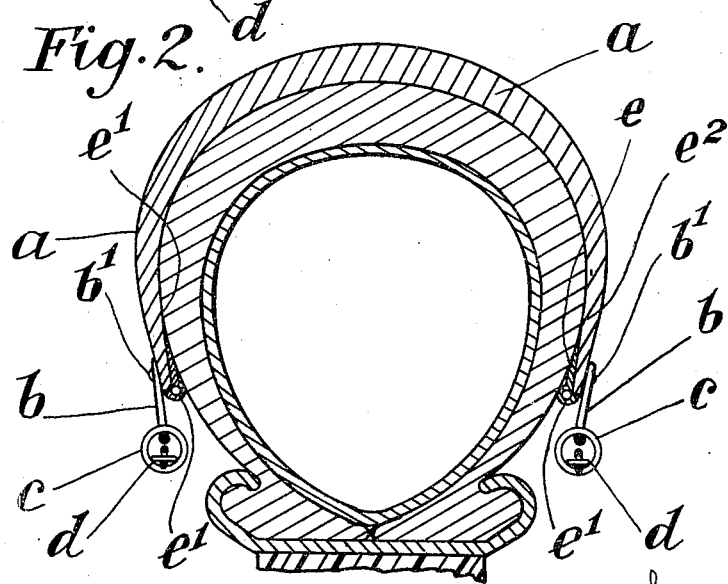

Figure 1 is a side view of a portion of a tire. Fig. 2 is a cross section.

Referring to the drawings, each side edge of the cover or band $a$ is provided with a series of V shaped pieces or loops $b$ which are preferably secured thereto by means of rivets $b^1$ arranged equi-distantly around the cover or band, each piece or loop $b$ being secured to the cover or band $a$ by means of a pair of rivets $b^1$ and carrying a ring or loop $c$ for the passage of the flexible member $d$ which preferably takes the form of a chain whose ends are connected together by means of a bolt or the like (not shown), and the length of the chain may be adjusted or varied as required by the addition or removal of one or more links.

Each edge of the cover or band $a$ is provided on the inner side thereof with a rubber or other like strip or ring $e$ which is solutionized or otherwise secured in place, this strip or ring $e$ extending to the extreme edge of the cover or band and being preferably tapered in cross section and having a beading or ridge $e^1$ (either hollow or solid) adapted to serve as a cushion between the edge of the cover or band $a$ and the tire and to prevent the passage of dust or moisture. The strip or ring $e$ is preferably tapered off to a feather edge at $e^2$ so as to prevent any unevenness in the interior of the cover or band $a$ and is also adapted to protect the tire from the rivets $b^1$.

Claims:

1. In a protector for pneumatic tires, comprising a cover piece, suitable means provided on the cover piece for attachment on the tire, a dirt excluding device provided on the sides of the cover comprising a tapered strip, said strip having a beading on its outer end to provide a cushion between the edge of the protector and the tire, substantially and for the purpose set forth.

2. In a protector for pneumatic tires comprising a cover piece, means riveted on the cover piece for attaching the cover in place on the tire, a dirt excluding device provided on the sides of the cover piece comprising an enlarged end or beading for abutment on the tire and a tapered feather edge extending between the tire and the end of the cover piece to protect the tire from the rivets of the attaching means all substantially and for the purpose set forth.

EDWARD SCOTT.

Witnesses:
 H. NIXON,
 OSCAR FEDKARCH.